(No Model.)  3 Sheets—Sheet 1.
J. P. KENNEDY.
METHOD OF AND MACHINE FOR CLOSING THE ENDS OF TUBES.
No. 368,837. Patented Aug. 23, 1887.
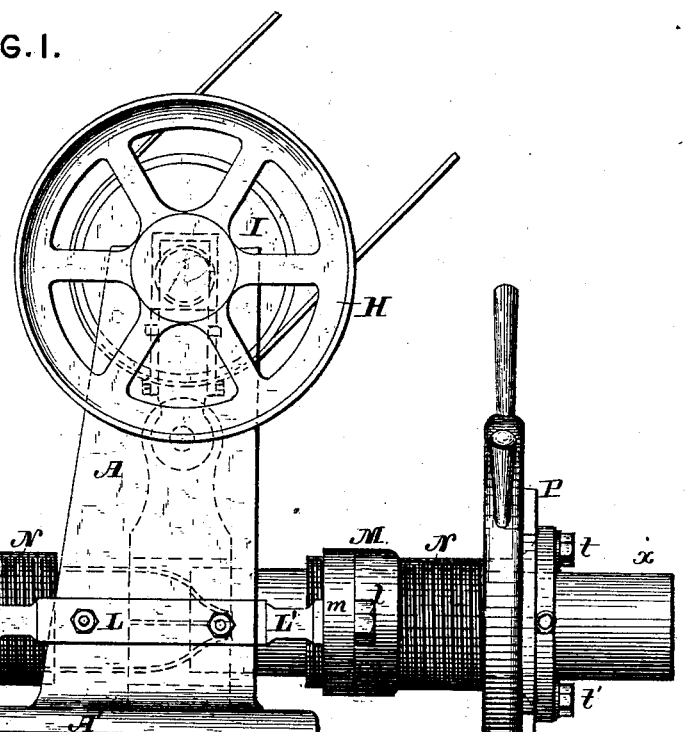
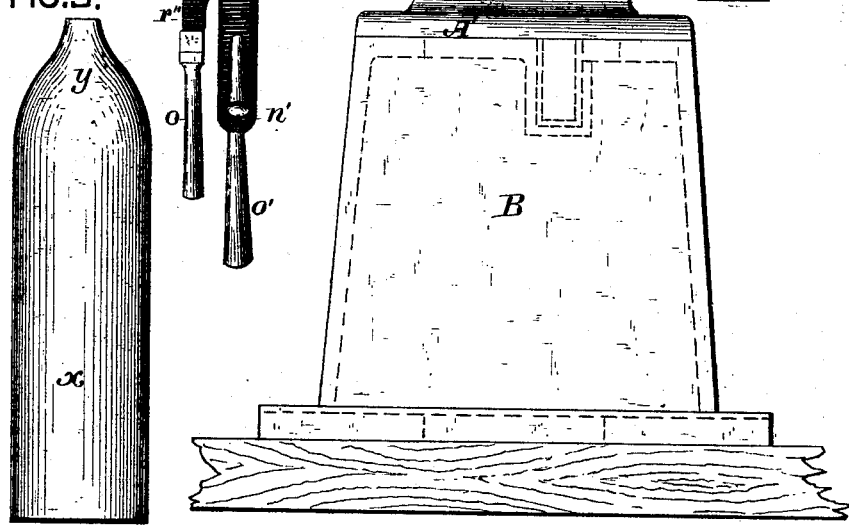
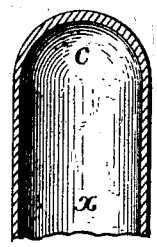
ATTEST.
J. Henry Kaiser.
Victor J. Evans.
INVENTOR.
John P. Kennedy
By E. B. Clark
Atty.

(No Model.)
J. P. KENNEDY.
METHOD OF AND MACHINE FOR CLOSING THE ENDS OF TUBES.
No. 368,837. Patented Aug. 23, 1887.
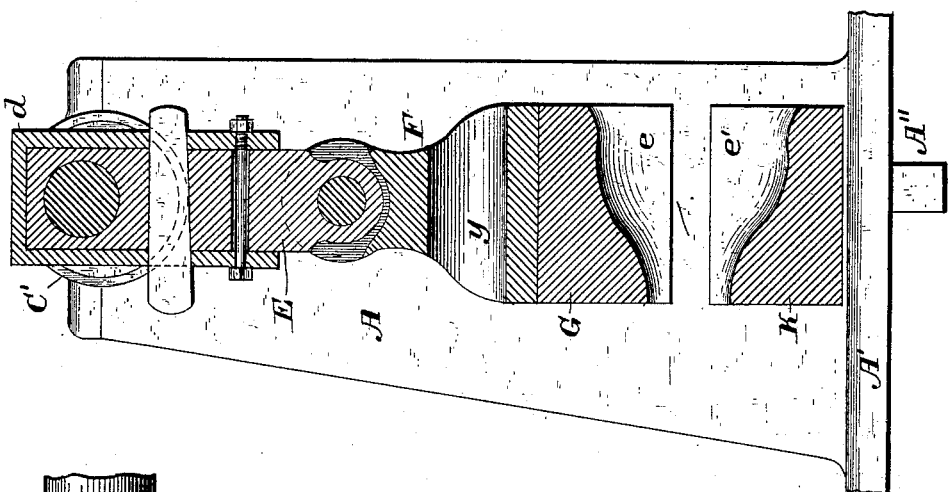
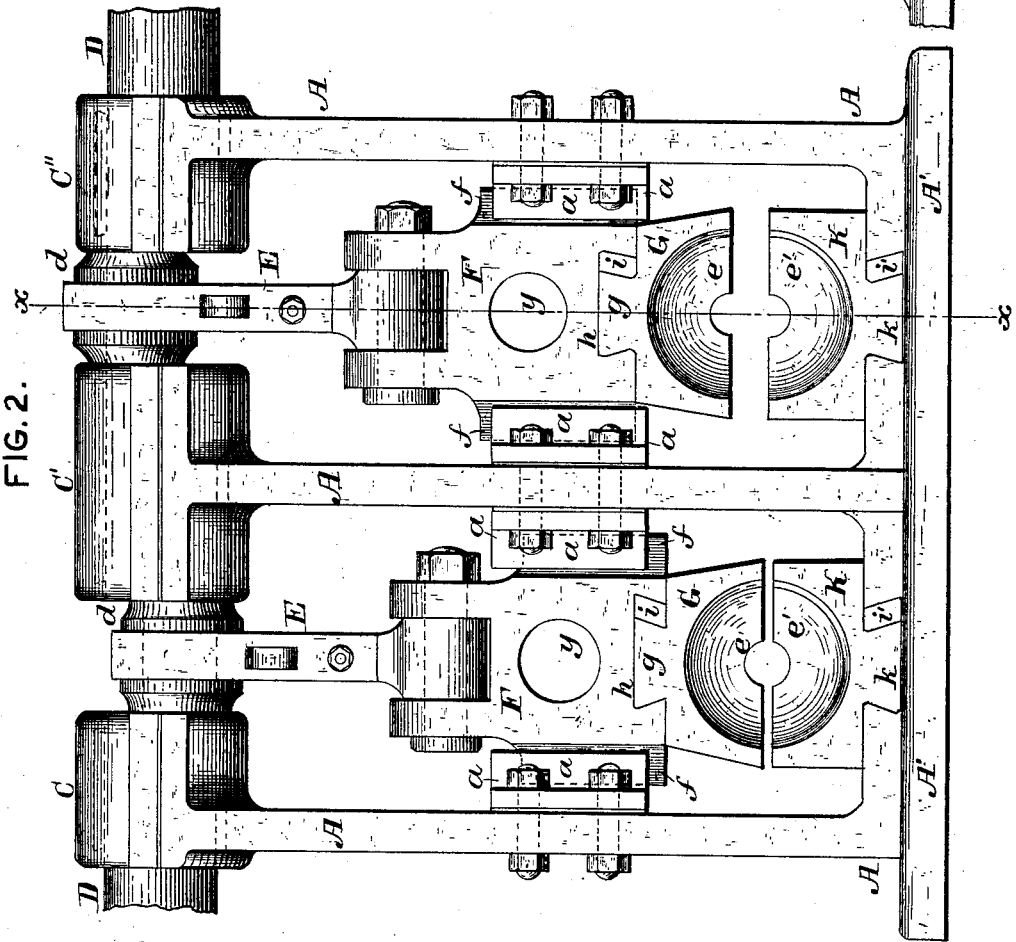
ATTEST.
J. Henry Kaiser
Victor J. Evans.
INVENTOR.
John P. Kennedy
By E. B. Clark
Atty.

(No Model.) 3 Sheets—Sheet 3.
J. P. KENNEDY.
METHOD OF AND MACHINE FOR CLOSING THE ENDS OF TUBES.
No. 368,837. Patented Aug. 23, 1887.
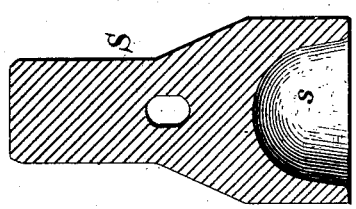
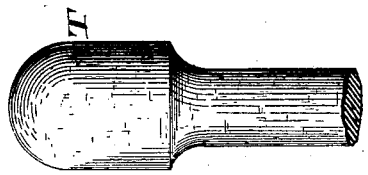
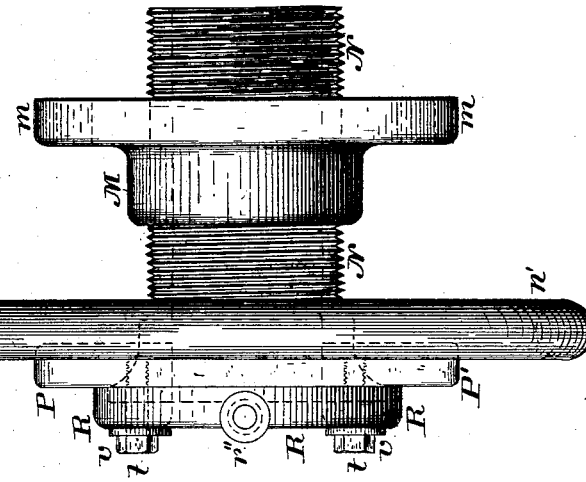
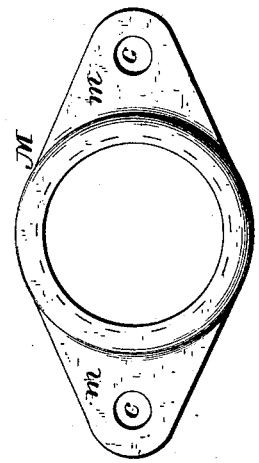
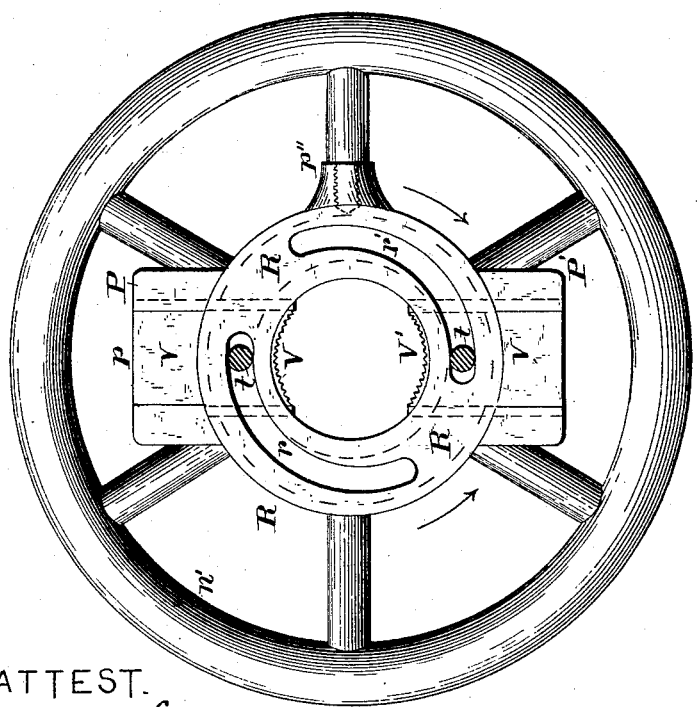
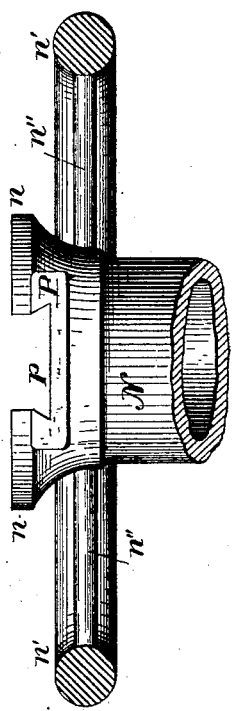
ATTEST.
J. Henry Kaiser
Victor J. Evans.
INVENTOR.
John P. Kennedy
By E. B. Clark,
Atty.
N. PETERS, Photo-Lithographer, Washington, D. C.

UNITED STATES PATENT OFFICE.

JOHN P. KENNEDY, OF NEW YORK, N. Y.

METHOD OF AND MACHINE FOR CLOSING THE ENDS OF TUBES.

SPECIFICATION forming part of Letters Patent No. 368,837, dated August 23, 1887.

Application filed March 24, 1887. Serial No. 232,244. (No model.)

*To all whom it may concern:*

Be it known that I, JOHN P. KENNEDY, a citizen of the United States, residing at New York city, in the county of New York and State of New York, have invented certain new and useful Improvements in the Method of and Machine for Swaging and Welding the Ends of Wrought-Metal Tubes; and I do hereby declare the following to be a full, clear, and exact description of the invention, such as will enable others skilled in the art to which it appertains to make and use the same.

This invention relates to the method of and machine for closing the ends of wrought-metal tubes by welding the metal directly upon itself, so as to form a seamless rounded end of thickened metal capable of standing a high pressure.

The object of the invention is to provide, first, an improved method or process of conducting the operation, whereby tubes with welded ends are produced of superior finish and durability, and, second, a machine which is simple in construction and effective in operation—one which is capable of rapid and accurate execution, so that the heated tube end may be properly shaped into form at a single heat.

I will first particularly describe my improved machine, and then set forth in detail my method of forming a perfectly-welded closure of the tube in the description of the operation.

In the accompanying drawings, Figure 1 represents a side elevation of the machine properly mounted on its base and with the feed-gears arranged on its opposite sides. Fig. 2 represents a front elevation, on an enlarged scale, of the top operating part of the machine with the feeding mechanism removed. Fig. 3 represents a vertical section on the line *x x*. Fig. 4 represents a side elevation, on enlarged scale, of the tube-feeding mechanism. Fig. 5 represents an end view, and Fig. 6 represents a top view, thereof. Fig. 7 represents a front view of the feed-nut. Fig. 8 represents the finishing mandrel and die. Fig. 9 represents the tube with contracted end as swaged in the machine. Fig. 10 represents a sectional view of the finished tube.

In Fig. 2 the outer flaring openings of both sets of dies are, for convenience of illustration, shown on the same side of the machine; but in practice they would generally be arranged to face in opposite directions, as in Fig. 1, where the feed-gears are also mounted on opposite sides of the machine, so that both can be more conveniently operated at the same time. The dies can readily be slid by their tongues into the dovetailed grooves forming their seats, so that their large openings shall face in either direction—that is, to the right or left.

The frame A and bed-plate A', supporting the working part of the machine, are preferably made of cast-iron and rest upon the iron or other base, B, at a suitable height for convenient manipulation. Suitable journal-boxes, C C' C'', are arranged at the tops of the frame-plates A, and in them is journaled the shaft D, having the eccentrics or short cranks *d d'*, to which are connected, through the medium of suitable brass boxes, straps, bolts, and keys, the connecting-rods E. In a machine of a suitable size for my purpose a steel shaft, D, is used three inches in diameter, and is turned down at the eccentrics to two inches diameter, so as to give one inch throw or stroke to the connecting-rod and die. The shaft D is provided with a fly-wheel, H, and a belt-wheel, I. (Shown in Fig. 1.) The fly-wheel, however, may be omitted, and I obtain good results without it. The cross-head F, having suitable lugs with eyes, is bolted to rod E, so as to form a suitable joint, and is provided with an opening, *y*, to make it lighter. Water may be run in this opening to cool the cross-head. The sides are provided with vertical guide-tongues *f*, which fit and slide in the grooved guideways *a*, bolted to the frame A. The lower face of the cross-head is provided with a longitudinal dovetail groove, *h*, into which is fitted the dovetail tongue *g* of die G, and is secured therein by the key *i*, thus rigidly connecting the die with the cross-head.

Die G is provided in the lower face with a concave or semi-conical cavity, *e*, which, however, does not end in a point, but in a small semi-cylindrical opening. The lower die, K, is rigidly secured by means of its dovetail tongue *k* and a key, *i'*, in a dovetail groove of the bed-plate, and, like die G, is provided with a concave or approximately semi-conical cavity, e'. The contour or surface of the cavity is not regular, but is hollowed or bellied more at the middle portion, and then converges into a passage and semi-cylindrical opening, as shown in Fig. 3. A short plug may be inserted in the passage to act as a stop when the tube has passed the desired distance into the dies and is sufficiently swaged.

The feeding-gear for gradually and regularly forcing the end of the tube to be swaged and welded into the dies is shown in position in the machine on each side of the frame in Fig. 1, and in enlarged detail in Figs. 4 to 7, inclusive. The whole feeding-gear is secured to the frame A of the machine by bolt-bars L L', which are themselves riveted or bolted to the frame, and upon their outer ends carry the large feed-nuts M, as shown in Fig. 1. The feed-nuts M are provided upon opposite sides with large ears or lugs $m$, having bolt-holes $c$, as shown in Fig. 7, and are internally screw-threaded for receiving the feed-cylinder N. They are slid upon the screw-threaded ends of bars L up to shoulders upon said bars, and are secured in position by small nuts $l$ about six inches from the front sides of the dies.

Bolt-bars L L' are secured to the intermediate vertical plate, as well as to the end plates of the frame A, in the same horizontal plane, so that the bar L', which is bolted to the intermediate frame-plate, is seen in Fig. 1 extending to right on a line with bar L. Bar L' and a similar bar bolted to the farther end plate of frame A support the right-hand feed-gear (shown in Fig. 1) at the farther end of the machine for feeding tubes to a second set of dies beyond the set fed by the left-hand gear at the near end of the machine. The left-hand feed-gear is supported by the bar L, bolted to the near end plate of frame A, and by a similar bar bolted to the intermediate frame-plate, and, like bar L, extending to the left of the frame. The two end frame-plates and the intermediate or middle frame-plate are clearly shown in Fig. 2.

The feed-cylinder N, the guideways P P', and the hand-wheel are cast in one piece, and the cylinder is turned true and externally screw-threaded up to a shoulder near its outer end. The guideways P P' are provided with longitudinal dovetail grooves $p\ p'$, extending from their outer ends to the inner periphery of cylinder N, as shown in Figs. 5 and 6, for receiving the toothed gripping-jaws V V', which are made to slide freely in the grooves. The hand-wheel is connected by spokes $n''$ with the end of cylinder N. The outer end of cylinder N is provided with a raised annular rim, $n$, and upon the end face of the cylinder and over this rim there is fitted by a flange the slotted ring R, so that it may freely turn thereon. The ring is provided upon opposite sides with the eccentric slots $r\ r'$. Bolts $t\ t$, screw-threaded at their ends, are passed through these slots and screwed up to their shoulders into the jaws V V'. The outer ends of the bolts are provided with heads or with nuts $v$, which, being placed in position, hold the slotted ring loosely upon the end of the cylinder, since the jaws are held in their dovetail grooves $p\ p'$.

It will be seen that the ring is free to rotate to the extent of its eccentric slots, and that the jaws are slid out and in a distance equal to the eccentricity of the slots. The ring R is provided with a boss, $r''$, having a screw-threaded hole into which is screwed the operating-handle $o$. (Shown in Fig. 1.) The hand-wheel $n'$ may also be provided with radial handles $o'$.

For smaller-sized tubes than those to which feed-cylinder N is adapted, a suitable cylindrical bushing having its walls tapering internally to the proper-sized opening is slipped into the inner end of the feed-cylinder N. Gripping-jaws adapted to smaller tubes may be substituted for those here shown, so that tubes of various sizes may be worked in the same machine. The jaws can be readily removed by withdrawing bolts $t$ and different ones inserted. For smaller tubes the serrated end of each jaw would be provided with a smaller curve adapted to the size of the tube, and the bolt-holes would be so placed that the jaws, when in position, would be thrown by rotation of the slotted ring R to firmly grip the tubes. For smaller tubes, the jaws would have to project when retracted a short distance into the feed-cylinder, as the extent of their movement by the slotted ring would remain the same.

In Fig. 2 the left-hand upper die is shown at the end of its downward stroke, in which position it stops short of the lower die, leaving a space between them which, in the working machine, amounts to about one-quarter of an inch. The right-hand upper die is shown at the end of its upward stroke. The dies are given one inch throw at each revolution of shaft D and the shaft is made to revolve very rapidly, so that short quick blows are given to the tube end being swaged. The machine is usually run so as to make from five hundred and fifty to six hundred and fifty strokes per minute.

In Fig. 1 the feed-gears are shown upon opposite sides of the machine—that on the left-hand side being at the nearer end and that on the right-hand side being at the farther end thereof. Evidently the feeding-gears of the adjacent dies can be more conveniently operated upon opposite sides of the machine when they are close together. Though but two sets of dies are shown in position in the machine, any desired number may be used by arranging them in line and extending the main shaft.

My method and machine are particularly adapted for closing the ends of wrought-iron or steel tubes suitable for use with any form of radial tube or porcupine boiler. In such boilers it is essential that the tubes shall have their ends closed with seamless welded metal, preferably thickened and of rounded or hemispherical form, so that the tube shall be extra strong and durable at such point, and be free from crevice or irregular depression, in order that the circulating water shall scour the surface and prevent deposit of dirt, which would cause injurious overheating and burning of the metal. To fulfill these requirements and overcome the objections to and defects of tubes heretofore made, I employ my improved method of effecting the welding of the metal directly upon itself, as follows: The tube $x$, having been cut to the required length, is heated at the end to the proper temperature and is inserted in the feed-cylinder N, so as to project at its inner end a sufficient distance to enter the dies, and the gripping-jaws $v$ $v'$ are then quickly forced to grasp it by turning the slotted ring R into the position shown in Fig. 5. The upper die now being in operation, feed-cylinder N is turned in the threaded nut M as fast as necessary, and the tube thereby advanced between the dies and turned therein, while it is uniformly subjected to the swaging operation of the dies till it is suitably contracted, and, if desired, made to conform to their shape, the metal being compressed centrally at the conical tube end into a short projecting nipple, as shown in Fig. 9. The swaging by the semi-conical dies being completed, the jaws V V' are opened and the tube withdrawn, and afterward the feed-cylinder is run back to the desired position. By means of the feed-gear the tube is fed forward and rotated in the die in a positive regular manner, so that it is neatly and uniformly swaged to the conical form with a projecting nipple, and finished so far as the operation of this machine is concerned. This operation, though neatly and expeditiously performed, does not produce a perfectly closed and welded end, and further steps are required to produce a tube having a welded seamless end of thickened metal of rounded or hemispherical form adapted to my purpose. The extreme end of the tube is accordingly reheated to a welding heat, and the tube is then slid down over the rounded or hemispherical end of a mandrel, T, and by rapid blows with the cupping-tool or swage S, having the hemispherical depression $s$, the nipple and conical end are quickly worked down into the thickened, rounded, and solid end, (shown at $c$ in Fig. 10,) without seam or joint, and having a smooth regular hemispherical inner surface, which will be effectively scoured and kept clean of dirt by circulating water when in practical operation.

I have learned by careful experimental practice that a satisfactorily-welded tube end cannot be formed with semi-conical or hemispherically hollowed dies operating upon the end of the tube without a mandrel, that by such operation the metal of the tube is more or less drawn and wrinkled internally into irregular shapes and cavities, and that a tight weld is not formed; neither can a satisfactory weld and closure be effected by the sole use of a round-ended mandrel and a cupping-die having a semi-cylindrical cavity and operating upon the uncontracted end of a tube over the mandrel. The tube end must be first contracted to an approximately conical form by the concave dies, and then finished with the mandrel having a hemispherical end and the cupping-tool having a hemispherical cavity in order to form a perfectly-welded seamless rounded end of thickened metal adapted for use in a high-pressure porcupine steam-boiler.

Having described my invention, what I claim, and desire to secure by Letters Patent, is—

1. The herein-described method of closing the ends of wrought-metal tubes, which consists in heating the end of a tube to a proper working heat, then subjecting it to the swaging action of semi-conical or concave dies till the end is suitably contracted, then reheating the end and sliding the tube upon a mandrel having a rounded or hemispherical end, and by means of a suitable die swaging and welding the tube end into a rounded form without seam or joint, for the purpose described.

2. The herein-described method of closing the ends of wrought-metal tubes by welding the metal directly upon itself and forming a rounded seamless end of thickened metal, which consists in suitably heating the end of a tube, then feeding it forward and rotating it while it is subjected to the swaging action of a pair of semi-conical or concave dies till a conical end is formed, then reheating the end to a welding heat and sliding the tube upon a mandrel having a rounded or hemispherical end, and then by means of a die having a concave rounded recess swaging and welding the tube end into a rounded hemispherical form of thickened metal without seam or joint, for the purpose described.

3. In a machine for swaging the ends of wrought-metal tubes, the upper and lower die-sections, each having a semi-conical cavity with extended small semi-cylindrical passage or opening for forming a conical end and a projecting nipple on the tube, in combination with mechanism for operating the upper die, and a feed-gear, for the purpose described.

4. In a machine for swaging the ends of wrought-metal tubes, the upper and lower die-sections, each having a semi-conical cavity with extended small semi-cylindrical passage or opening for forming a conical end and a projecting nipple on the tube to be swaged.

5. In combination with the dies for welding the ends of wrought-metal tubes and operating mechanism, the feed-gear adapted to feed the tube forward and rotate it in the die during the swaging operation, as described.

6. In a machine having dies for swaging and welding the ends of wrought-metal tubes, the feed-gear consisting of a fixed screw-threaded feed-nut, and a screw-threaded feed-cylinder operating in such nut and having means for holding the tube within it, for the purpose described.

7. In a machine for welding the ends of wrought-metal tubes, the feed-nut properly secured in front of the dies, in combination with the feed-cylinder working in such nut, and having sliding toothed jaws and means for operating such jaws for causing them to grasp or release the tube, substantially as described.

8. In combination with the feed-nut, the feed-cylinder having dovetailed guideways and toothed jaws fitted to slide therein, and the ring R, provided with eccentric slots connected by bolts to the jaws, as and for the purpose described.

9. In a machine for welding the ends of wrought-metal tubes, the feed-nut rigidly secured by bars L to the frame of the machine a suitable distance in front of the dies, in combination with the feed-cylinder provided with mechanism for gripping and holding the tube while it is being operated upon by the dies, as described.

10. In combination with the feed-cylinder, the flanged ring R, fitted to the end thereof, and having eccentric slots $r\ r'$, engaging with the bolts $t\ t$ in the sliding jaws $V\ V'$, as and for the purpose described.

11. The feed-cylinder having the guideways P and the hand-wheel $n'$, all cast in one piece, as and for the purpose described.

In testimony whereof I affix my signature in presence of two witnesses.

JOHN P. KENNEDY.

Witnesses:
W. C. BESSON,
G. L. PORTER.